United States Patent
Bellingkrodt et al.

(10) Patent No.: US 10,395,507 B2
(45) Date of Patent: Aug. 27, 2019

(54) EMERGENCY COMMAND DEVICE AND SAFETY SYSTEM WITH AN EMERGENCY COMMAND DEVICE

(71) Applicant: Pilz GmbH & Co. KG, Ostfildern (DE)

(72) Inventors: Martin Bellingkrodt, Ostfildern (DE); Jörg Seid, Ostfildern (DE); Sergej Birt, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 0 days.

(21) Appl. No.: 15/820,087

(22) Filed: Nov. 21, 2017

(65) Prior Publication Data

US 2018/0144603 A1    May 24, 2018

(30) Foreign Application Priority Data

Nov. 21, 2016   (DE) .......................... 10 2016 122 370

(51) Int. Cl.
   *G08B 21/18*     (2006.01)
   *G08B 5/36*      (2006.01)
   (Continued)

(52) U.S. Cl.
   CPC ............. *G08B 21/182* (2013.01); *G05B 9/03* (2013.01); *G08B 5/36* (2013.01); *H02H 3/04* (2013.01);
   (Continued)

(58) Field of Classification Search
   CPC .......... G08B 21/182; G08B 5/36; G05B 9/03; H02H 3/04
   (Continued)

(56) References Cited

U.S. PATENT DOCUMENTS 5,263,570 A    11/1993  Stinemark
7,130,171 B2 * 10/2006  Pullmann ................. G05B 9/03
                                                     361/62
(Continued)

FOREIGN PATENT DOCUMENTS

DE    102006058708 A1    6/2008
DE    102015104567 A1   10/2015
(Continued)

OTHER PUBLICATIONS

Search report in corresponding European Patent Application No. 17200905.2, completed on Apr. 12, 2018, with English translation.
(Continued)

*Primary Examiner* — Eric Blount
(74) *Attorney, Agent, or Firm* — Edell, Shapiro & Finnan, LLC

(57)  ABSTRACT

An emergency command device comprises: two safety inputs connectable to a control/evaluating unit to receive an input voltage; two safety outputs connectable to the control/evaluating unit; two electrical switching paths respectively extending between the two safety inputs and the two safety outputs; an emergency actuating unit comprising: a manually triggerable actuating element, a background element, and two switches connected to the actuating element and respectively disposed in the two electrical switching paths; a light emitting unit comprising red LEDs to backlight the actuating element and yellow LEDs to backlight the background element; a voltage detector detect an electrical output voltage at one of the two safety outputs; and a flashing circuit arrangement coupled to activate flashing of the yellow LEDs and/or the red LEDs in response to detection by the voltage detector of a drop in the output voltage below a preset or presettable threshold value.

10 Claims, 2 Drawing Sheets

(51) Int. Cl.
*H02H 3/04* (2006.01)
*H02H 3/10* (2006.01)
*G05B 9/03* (2006.01)

(52) U.S. Cl.
CPC ..... *H02H 3/10* (2013.01); *G05B 2219/23172* (2013.01); *G05B 2219/24003* (2013.01)

(58) Field of Classification Search
USPC ........................................................ 340/660
See application file for complete search history.

(56) References Cited

U.S. PATENT DOCUMENTS

| | | | |
|---|---|---|---|
| 8,688,244 B2* | 4/2014 | Kalhoff | G05B 19/4183 340/12.51 |
| 9,115,848 B1 | 8/2015 | Gingras | |
| 2003/0011250 A1* | 1/2003 | Pullmann | F16P 3/00 307/326 |
| 2004/0160131 A1* | 8/2004 | Veil | F16P 3/00 307/116 |
| 2015/0280416 A1* | 10/2015 | Kreuter | H01H 83/00 361/55 |
| 2017/0186564 A1* | 6/2017 | Bellingkrodt | H01H 9/161 |

FOREIGN PATENT DOCUMENTS

| | | |
|---|---|---|
| DE | 102014113135 A1 | 3/2016 |
| EP | 1780738 A1 | 5/2007 |
| WO | 2016038078 A1 | 3/2016 |

OTHER PUBLICATIONS

Office Action in corresponding German Patent Application No. 10 2016 122 370.0, dated Sep. 21, 2017, with English translation.

* cited by examiner

EMERGENCY COMMAND DEVICE AND SAFETY SYSTEM WITH AN EMERGENCY COMMAND DEVICE

CROSS REFERENCE TO RELATED APPLICATIONS

This application claims foreign priority under 35 U.S.C. § 119(a)-(d) to Application No. DE 102016122370.0 filed on Nov. 21, 2016, the entire contents of which are hereby incorporated by reference.

TECHNICAL FIELD

The present invention relates an emergency command device, comprising a first and a second safety input, which can be connected to a control and evaluating unit and can be supplied with an input voltage by the control and evaluating unit when the emergency command device is in operation; a first and a second safety output, which can be connected to the control and evaluating unit; a first electrical switching path, which extends between the first safety input and the first safety output; a second electrical switching path, which extends between the second safety input and the second safety output; an emergency actuating unit, which has a manually triggerable actuating element, which is connected to two mechanically, positively opening switches, and a background element, wherein a first switch is disposed in the first electrical switching path, and a second switch is disposed in the second electrical switching path, as well as a light emitting unit with a group of red light emitting diodes, which are arranged such that they can backlight the actuating element, and with a group of yellow light emitting diodes, which are arranged such that they can backlight the background element. Furthermore, the present invention relates to a safety system for putting a dangerous machine or an industrial plant into a safe operating state, the safety system comprising a control and evaluating unit, which has at least one safety output, to which a control element is connected, and upon actuation, this control element is designed to put the machine or industrial plant into the safe operating state; as well as at least one emergency command device, which is connected to the control and evaluating unit.

The relevant standards require that the emergency command device of the safety controller be visually distinct from its surrounding area such that it can be quickly recognized as such by the operating personnel in the case of an emergency. The manually triggerable actuating element has to appear permanently in the signal color red. In contrast, a background element of the actuating element, which forms a contrast element for the actuating element and can be formed, for example, by a ring element, which extends around the actuating element, has to appear in the signal color yellow. In emergency command devices of a very simple design, unlit actuating elements made of a red colored plastic and unlit background elements made of a yellow colored plastic are used. Furthermore, the prior art already discloses emergency command devices, which have a backlit actuating element and a backlit background element. The actuating element is made of a red transparent plastic and is lit. The background element is made of a yellow, also transparent plastic and is also lit. In an unlit state the actuating element and the background element still appear in the signal colors red and yellow.

In the case of the safety systems, known from the prior art, there is often the problem that the localization of the emergency command device, which was triggered manually by the operating personnel, has to be intricately designed by the control and evaluating unit, in particular, in more complex machines or industrial plants that have a large number of emergency command devices. The result is, in particular, a higher degree of programming sophistication for the programming of the control and evaluating unit.

BACKGROUND

The object of the present invention is to provide an emergency command device and a safety system of the type, described in the introduction of the specification, such that the manual triggering of the emergency command device can be detected with ease.

SUMMARY

The emergency command device of the invention is characterized by the feature that the emergency command device has at least one voltage detector, in particular, a comparator, for detecting an electrical output voltage at, at least, one of the safety outputs and a flashing circuit arrangement, which is connected to the voltage detector or comprises it, wherein the flashing circuit arrangement is configured to activate a periodic or non-periodic flashing of the yellow light emitting diodes and/or the red light emitting diodes of the light emitting unit, when the voltage detector has detected a drop in the output voltage below a preset or presettable threshold value. The emergency command device of the invention enables in a straightforward manner an optical visualization of the emergency command device, when its actuating element has been manually triggered by the operating personnel. When the dangerous machine or industrial plant, which is equipped with the activated emergency command device, runs faultlessly, both switches of the emergency actuating unit are in a closed position, so that the output voltage at the two safety outputs matches the respective input voltage at the safety inputs. The red and yellow light emitting diodes of the light emitting unit are supplied with an electric operating current, so that they glow permanently. At the same time the actuating element is backlit red; and the background element is backlit yellow, so that the emergency command device satisfies the relevant standards with respect to the mandatory signal colors of the actuating element and the background element. Thus, the emergency command device can be visually recognized as such by the operating personnel. Since the actuating element and the background element actively glow in the prescribed signal colors red or yellow, it can also be recognized that the emergency command device is, indeed, activated and, thus, ready to operate.

If at the onset of a hazardous situation the actuating element of the emergency command device is manually triggered by the operating personnel, the two positively opening switches, in particular, the push buttons, of the emergency actuating unit are opened, so that the result is a voltage difference between the input voltages at the two safety inputs and the output voltages at the two safety outputs. The output voltages at the safety outputs are smaller than the input voltages at the two safety inputs. The flashing circuit arrangement is configured such that when the voltage detector, in particular, the comparator detects that the output voltage at one of the safety outputs has dropped below the preset or presettable threshold value, the yellow light emitting diodes of the light emitting unit are controlled such that they no longer glow constantly, but rather flash periodically or, as an alternative, also non-periodically. The threshold value of the output voltage at one of the safety outputs, below which the flashing circuit arrangement activates the flashing of the yellow light emitting diodes of the light emitting unit, can be set, for example, to 50% to 75% of the amount of the input voltage at the safety input of the respective switching path. The flashing of the yellow light emitting diodes of the light emitting unit makes it possible to visually signal in a simple way the manual triggering of the actuating element, which opens the switches and, as a result, also the two electrical switching paths. Since the background element, which is permanently backlit yellow during faultless operation, is not relevant to safety according to the relevant standards, it is allowed that the yellow light emitting diodes of the light emitting unit do not glow permanently, but rather flash after the manual triggering of the actuating element. This flashing of the yellow light emitting diodes can visually signal to the operating personnel in a simple way that the emergency command device in question was triggered. Hence, there is advantageously no need for an expensive localization of the emergency command device, which was triggered by the operating personnel, by the control and evaluating unit. As a result, it is possible to reduce the programming complexity for programming the control and evaluating unit.

In principle, it is also conceivable that upon triggering the actuating element and upon opening the two switches, the flashing circuit arrangement activates the flashing of the red light emitting diodes of the light emitting unit. However, this feature is not presently allowed, because the relevant standards require that the actuating element must glow permanently in the signal color red. In contrast, the flashing of the red light emitting diodes of the light emitting unit would result in the actuating element not glowing permanently, but rather the illumination thereof is switched on or off periodically or non-periodically.

In one advantageous embodiment it is proposed that the voltage detector be connected by a measuring lead to at least one of the two safety outputs.

In a particularly advantageous embodiment it is possible that the emergency command device comprises a supply circuit, which is connected to the two safety inputs, and a regulated power source, which is connected to the supply circuit and to the light emitting unit. The supply circuit is able to supply the regulated power source for operating the light emitting unit with an operating voltage that is necessary to operate the light emitting unit.

Preferably the group of red light emitting diodes and the group of yellow light emitting diodes can be electrically connected together in series. This arrangement makes it particularly easy to design the circuit.

As already explained above, the background element of the actuating element for the emergency command device is not relevant to safety, so that it may flash in the signal color yellow. The consequence thereof is that the red illumination of the manually triggerable actuating element, which is implemented by the red light emitting diodes of the light emitting unit, has to be reliable, if the emergency command device is connected to a dangerous machine or an industrial plant and is ready to operate. This means that in the event that the red illumination of the actuating element fails, the machine or industrial plant, which is connected to a safety system, which is equipped with the emergency command device, has to be forced to come automatically to an emergency stop, because the actuating element no longer glows in the signal color red, even though it should be visible, according to the standard and, thus, should glow.

In order to satisfy this requirement, it is proposed in a preferred embodiment that the emergency command device comprise a first diagnostic device, which has an electronic switch, which is disposed in at least one of the two electrical switching paths, wherein the first diagnostic device is connected by a measuring lead to the light emitting unit and is configured to detect an actual operating voltage of the red light emitting diodes of the light emitting unit and to open the electronic switch when the actual operating voltage deviates from a desired operating voltage. This opening of the electronic switch of the first diagnostic device may be detected by the control and evaluating unit, so that the control and evaluating unit may put the machine or the industrial plant into a safe operating state by at least one control element.

In a particularly preferred embodiment there is the possibility that the first diagnostic device comprises a comparator, in particular, a window comparator, which is connected to the measuring lead and to the electronic switch, and is configured to detect the actual operating voltage of the red light emitting diodes of the light emitting unit and to open an electronic switch when the actual operating voltage deviates from the desired operating voltage.

In principle, the event may also arise that the regulated power source, with which the light emitting unit is operated, is not supplied with sufficient voltage. In order to be able to detect this state, too, it is, therefore, proposed in a preferred further development that the emergency command device comprise a second diagnostic device, which has an electronic switch, which is disposed in at least one of the two electrical switching paths, wherein the second diagnostic device is configured to detect by a measuring lead the electrical supply voltage of the light emitting unit and to open the electronic switch when the actual supply voltage deviates from a desired supply voltage. This opening of the electronic switch of the second diagnostic device may in turn be detected by the control and evaluating unit, so that the control and evaluating unit may put the machine or the industrial plant into a safe operating state by at least one control element.

In a preferred embodiment there is the possibility that the emergency command device has an electronic switch, which is associated with the flashing circuit arrangement and is connected to the light emitting unit, so that the flashing of the yellow light emitting diodes of the light emitting unit can be activated by the electronic switch and the flashing circuit arrangement.

In a particularly preferred embodiment it is proposed that the actuating element and the background element be made of a semi-transparent plastic that looks preferably gray in an unlit state. The use of a semi-transparent plastic to produce the actuating element and the background element has the advantage that in a deactivated state, in which, for example, the emergency command device is not connected to a dangerous machine or an industrial plant, the emergency command device cannot be recognized as such, because the actuating element and the background element do not appear in the prescribed signal colors red and yellow. The actuating element and the background element are semi-transparent, so that they allow the light to pass through such that the light that passes through does not look gray (in particular, the color of smoked glass). Due to the fact that in the deactivated state the actuating element and the background element appear preferably in the neutral color gray, the user can be prevented from supposing that the emergency command device is activated and then inadvertently actuating this emergency command device, instead of a different emergency command device, which is, in fact, activated. As an alternative, it can also be provided that only the actuating element is made of a semi-transparent plastic that looks preferably gray in an unlit state; and the background element is made of a transparent plastic that looks yellow in an unlit state. The actuating element and the background element may also be made of a translucent plastic.

The control and evaluating unit is configured such that it can detect the electric voltage at the two safety outputs of the emergency command device. For example, the control and evaluating unit comprises two comparators. In this case a first comparator can compare the input voltage at the first safety input with the output voltage at the first safety output. A second comparator can compare the input voltage at the second safety input with the output voltage at the second safety output. If at least one of the electrical switching paths was opened, for example, after triggering the actuating element or by the electronic switch of at least one of the optionally provided diagnostic devices, then the result is a voltage difference between the input voltage at, at least, one of the two safety inputs and the output voltage at, at least, one of the two safety outputs; and this voltage difference can be detected by the comparator of the control and evaluating unit. In this way the manual triggering of the actuating element or the opening of the electronic switch of at least one of the two diagnostic devices of the emergency command device can be detected. If the manual triggering of the actuating element or the opening of the electronic switch of at least one of the diagnostic devices was detected by the control and evaluating unit, then the at least one control element is activated by the control and evaluating unit and puts the machine or the industrial plant into the safe operating state (emergency stop state).

BRIEF DESCRIPTION OF THE DRAWINGS

Other features and advantages of the present invention will become apparent from the following description of preferred exemplary embodiments with reference to the accompanying drawings. The drawings show in FIG. 1 a diagrammatic, highly simplified representation, which illustrates the basic operating principle of an emergency command device, which is designed according to an embodiment of the present invention.

DETAILED DESCRIPTION

Figure 1:
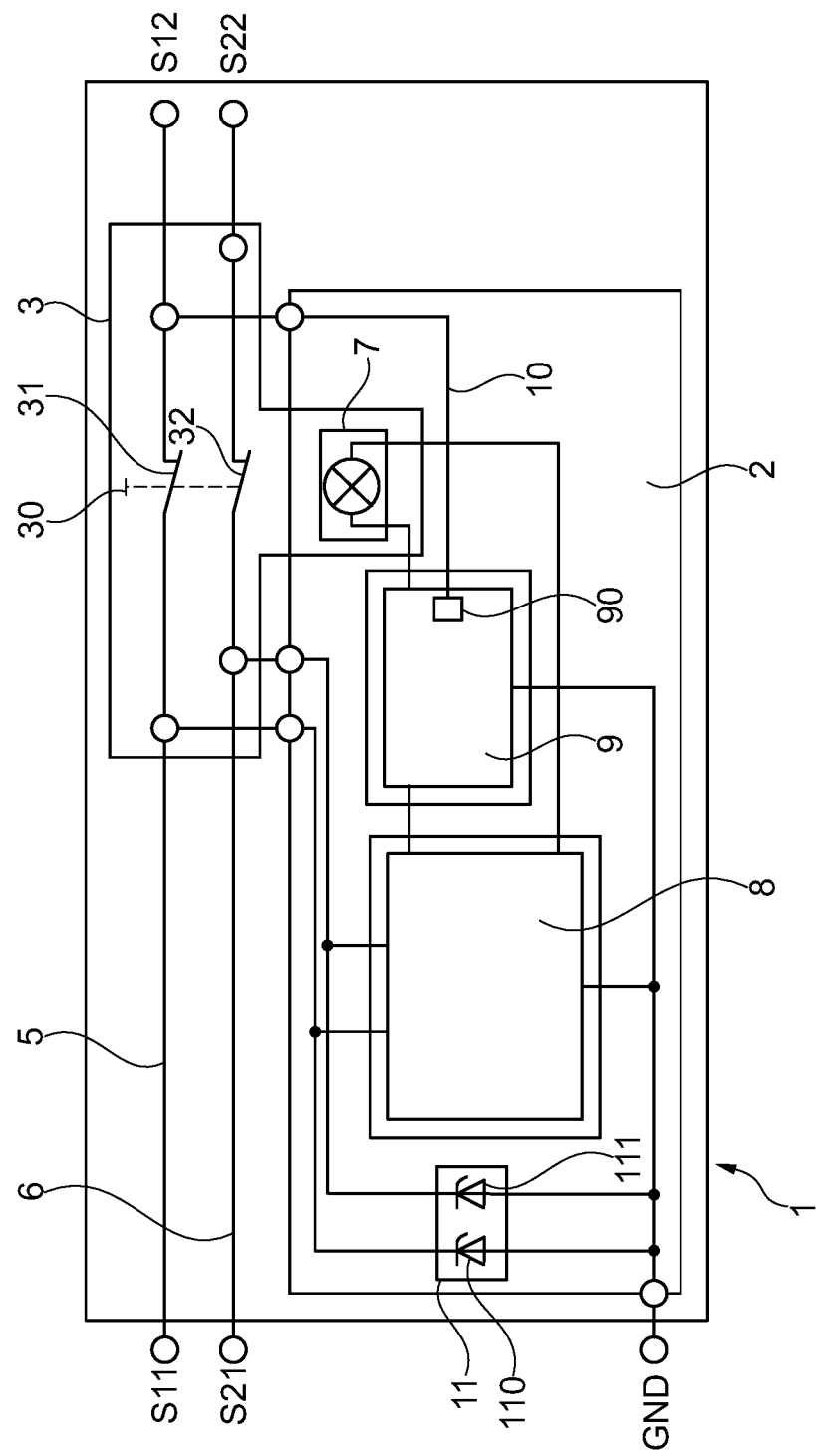

To begin with, the basic operating principle of an emergency command device 1 shall be explained below with reference to FIG. 1. In this context the emergency command device is designed according to a preferred exemplary embodiment of the invention and in the present case is an emergency stop command device for triggering an emergency stop function of a dangerous machine or an industrial plant.

The emergency command device 1 has a circuit arrangement 2 and an emergency actuating unit 3, which is connected to the circuit arrangement 2. The circuit arrangement 2 comprises two safety inputs S11, S21, which can be connected to a control and evaluating unit 4 (see FIG. 2) and which form an input circuit, as well as two safety outputs S12, S22, which can also be connected to a control and evaluating unit 4 and which form an output circuit. The control and evaluating unit 4 and the emergency command device 1 form together a safety system 100 (see FIG. 2) for putting a dangerous machine or an industrial plant into a safe state.

A first electrical switching path 5 extends between the first safety input S11 and the first safety output S12. Furthermore, a second electrical switching path 6 extends between the second safety input S21 and the second safety output S22.

The emergency actuating unit 3 has a manually triggerable actuating element 30, which is connected to two mechanically, positively opening switches 31, 32, which may be designed, in particular, as push buttons, wherein a first switch 31 is disposed in the first electrical switching path 5, and a second switch 32 is disposed in the second electrical switching path 6. Therefore, in the closed position of the two switches 31, 32 there is a continuous electrical connection between the first safety input S11 and the first safety output S12, on the one hand, and between the second safety input S21 and the second safety output S22, on the other hand. Since the circuit arrangement 2 has two safety inputs S11, S21, two safety outputs S12, S22 and two electrical switching paths 5, 6, the redundancy, which is required under safety aspects, is created.

The emergency command device 1 can be connected to the control and evaluating unit 4 in an advantageous way by a five core feed line with the corresponding attachment plugs. In this case two cores are allocated to the two safety inputs S11, S21; two cores, to the two safety outputs S12, S22; and one core, to ground GND. The control and evaluating unit 4 is designed such that it can supply the two safety inputs S11, S21 with an electrical input voltage. This feature has the advantage that there is no need for an additional voltage supply device to operate the emergency command device 1. In that case a six core feed line would have to be used for the electrical connection of the emergency command device 1. In contrast to the five core feed line used in the present case, however, this six core feed line is not an industrial standard. When the emergency command device 1 is operating, preferably the same input voltage (high level voltage), which may be, for example, 24 V, is applied to the two safety inputs S11, S21.

The relevant standards require that the emergency command device 1 be visually distinct from its surrounding area such that in an emergency it can be quickly recognized as such. The manually triggerable actuating element 30, which can be seen in detail in FIG. 2, has to appear in the signal color red. In contrast, a background element (contrast element) 33 of the actuating element 30, which can be formed, for example, by a ring element that extends around the actuating element 30, has to appear in the signal color yellow. In the present case the actuating element 30 and the background element 33 are made of a semi-transparent plastic, which looks gray in an unlit state. The use of this semi-transparent plastic to produce the actuating element 30 and the background element 33 has the advantage that in a deactivated state, in which, for example, the emergency command device 1 is not connected to a dangerous machine or an industrial plant, the emergency command device 1 cannot be recognized as such, because it does not appear in the signal colors red and yellow. Due to the fact that in the deactivated state the actuating element 30 and the background element 33 appear in the neutral color gray, the user can be prevented from supposing that the emergency command device 1 is activated and then inadvertently actuating this emergency command device, instead of a different emergency command device 1, which is actually activated.

In order to achieve an illumination of the emergency command device 1 in the requisite signal color red for the actuating element 30 and yellow for the background element 33, the emergency command device 1 has a light emitting unit 7, which is integrated into the emergency actuating device 3 and which comprises a first group with a number of red light emitting diodes and a second group with a number of yellow light emitting diodes. The two groups of red or yellow light emitting diodes are electrically connected together preferably in series and can be designed, in particular, as a light emitting diode strip or, as an alternative, also as a light emitting diode array. The red or yellow light emitting diodes of the light emitting unit 7 are arranged such that the red light emitting diodes can backlight the actuating element 30, so that they appear visually in the requisite signal color red; and the yellow light emitting diodes can backlight the background element 33, so that they appear visually in the requisite signal color yellow.

In order to be able to supply the yellow and red light emitting diodes of the light emitting unit 7 with an electric current, the circuit arrangement 2 has a power supply device 8, which can be designed, for example, as a switched mode power supply with integrated current control. Details of a possible configuration of the power supply device 8 are apparent from FIG. 2. The power supply device 8 is connected on the input side to the first electrical switching path 5, which is connected to the first safety input S11, and to the second electrical switching path 6, which is connected to the second safety input S21, so that it is possible to achieve a redundant voltage supply of the power supply device 8 with the input voltage, which is applied to the two safety inputs S11, S21. On the output side the power supply device 8 is connected to the light emitting unit 7 and to a flashing circuit arrangement 9, which in turn is also connected to the light emitting unit 7, and its function will be explained in greater detail below.

The flashing circuit arrangement 9 has a comparator 90 and is connected electrically to the first safety output S12 by a measuring lead 10, so that the electrical output voltage at the first safety output S12 can be detected and compared with a preset or presettable desired value. Furthermore, FIG. 1 shows an overvoltage protection device 11, which in the present case comprises a first Z diode 110, which is connected to the first electrical switching path 5 and to ground GND, and a second Z diode 111, which is connected to the second electrical switching path 6 and to ground GND. The power supply device 8 and the flashing circuit arrangement 9 in turn also have a ground connection.

In a faultless operation of the dangerous machine or industrial plant, equipped with the activated emergency command device 1, both switches 31, 32 of the emergency actuating unit 3 are in a closed position, so that the output voltage at the two safety outputs S12, S22 corresponds in each case to the input voltage at the safety inputs S11, S21. If the voltage, applied to the first safety input S21 is, for example, 24 V, then the comparator 90, which in this exemplary embodiment is integrated into the flashing circuit arrangement 9, also detects at the first safety output S12 an electrical output voltage in the amount of the input voltage (for example, 24 V). The yellow and red light emitting diodes of the light emitting unit 7 are supplied with a constant electric operating current by the power supply device 8, so that they permanently glow. In this case the actuating element 30 is backlit red; and the background element 33 is backlit yellow, so that the emergency command device 1 satisfies the relevant standards with respect to the required signal colors of the actuating element 30 and the background element 33. Since the actuating element 30 and the background element 33 glow in the prescribed signal colors red or yellow, it can also be recognized that the emergency command device 1 is actually activated and, thus, ready to operate, so that the emergency command device 1 can be recognized as such.

If at the onset of a hazardous situation the actuating element 30 is manually triggered by the operating personnel, then the two positively opening switches 31, 32, in particular, the push buttons, of the emergency actuating unit 3 are opened, so that the result is a voltage difference between the input voltages at the two safety inputs S11, S21 and the output voltages at the two safety outputs S12, S22. The output voltages at the safety outputs S12, S22 are smaller than the input voltages at the two safety inputs S11, S21. On opening the switches 31, 32, the output voltages at the safety outputs S12, S22 may be, in particular, 0 V, provided that the safety outputs S12, S22 were to be designed as potential free. However, the potential free design of the two safety outputs S12, S22 is not absolutely necessary.

The flashing circuit arrangement 9 is configured such that when the comparator 90 detects that the output voltage at the first safety output S12 has dropped below the preset or presettable threshold value, the yellow light emitting diodes of the light emitting unit 7 are controlled such that they no longer glow constantly, but rather flash periodically or, as an alternative, also non-periodically. For example, the yellow light emitting diodes may be bridged with the aid of an electronic switch, in particular, by a transistor, which is controlled by the flashing circuit arrangement 9. As a result, the flashing circuit arrangement 9 can control the flashing of the yellow light emitting diodes of the light emitting unit 7. The threshold value of the output voltage at the first safety output S12, below which the flashing circuit arrangement 9 activates the flashing of the yellow light emitting diodes of the light emitting unit 7, can be set, for example, to 50% to 75% of the amount of the input voltage at the first safety input S11. The flashing of the yellow light emitting diodes of the light emitting unit 7, which backlights the background element 33, makes it possible to visually signal in a simple way the manual triggering of the actuating element 30, which opens the switches 31, 32 and, as a result, also the two electrical switching paths 5, 6. Since the background element 33, which is permanently backlit yellow during faultless operation, is not relevant to safety in accordance with the relevant standards, it is allowed that the yellow light emitting diodes of the light emitting unit 7 flash after the manual triggering of the actuating element 30.

Figure 2:
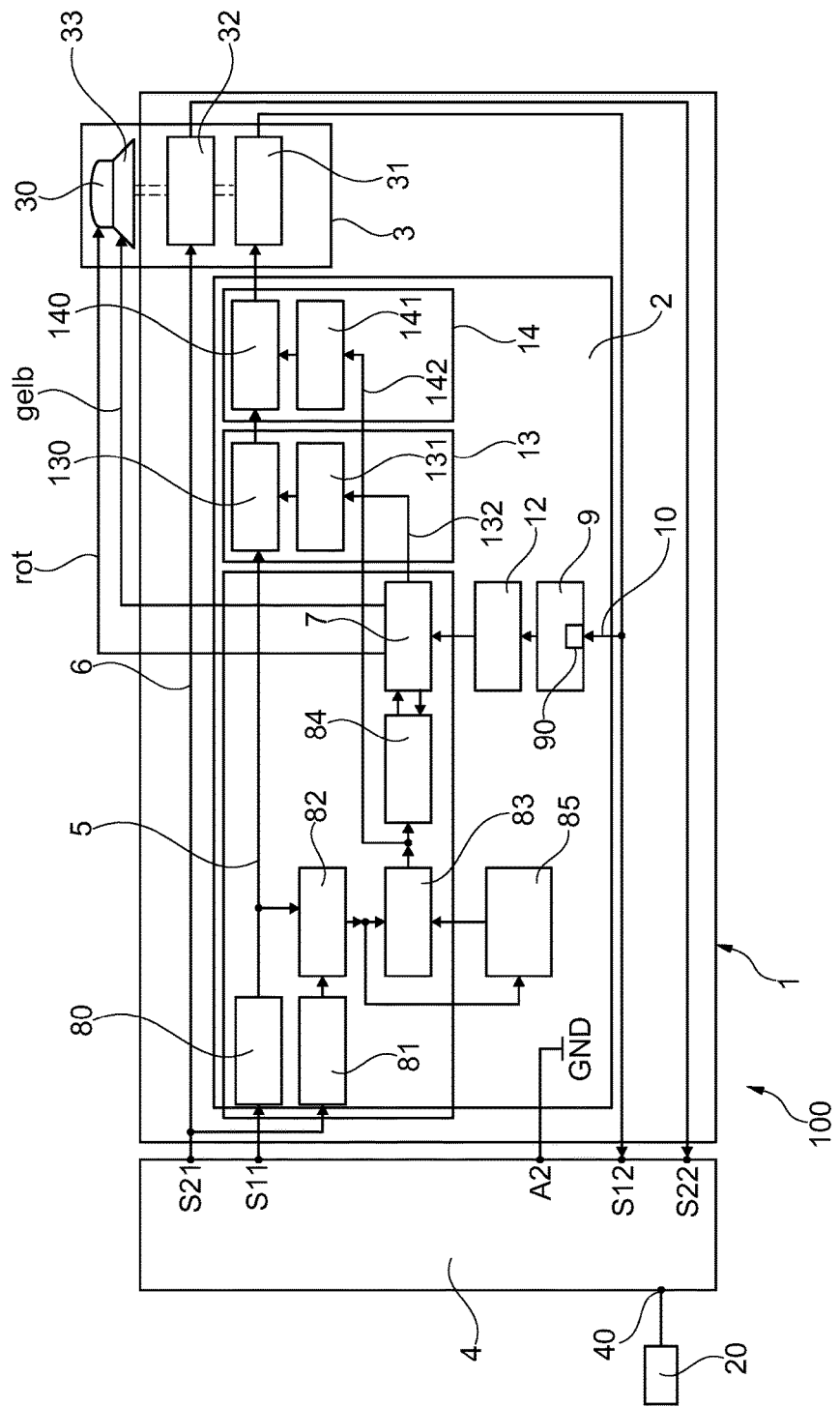
FIG. 2 a block diagram of a safety system with an emergency command device, which is a further development of the emergency command device from FIG. 1.

The control and evaluating unit 4, which is shown in FIG. 2 and which can also be used with the emergency command device shown in FIG. 1, is designed such that it can detect the electric voltage at the two safety outputs S12, S22. For example, the control and evaluating unit 4 may comprise in turn two comparators. A first comparator can compare the input voltage at the first safety input S11 with the output voltage at the first safety output S12. A second comparator can compare the input voltage at the second safety input S21 with the output voltage at the second safety output S22. If the electrical switching paths 5, 6 are opened after the triggering of the actuating element 30, then the result is a voltage difference between the input voltages at the two safety inputs S11, S21 and the output voltages at the two safety outputs S12, S22; and this voltage difference can be detected by the comparator of the control and evaluating unit 4. In this way the triggering of the actuating element 30 of the emergency command device 1 can be detected. The control and evaluating unit 4 has a safety output 40 (see FIG. 2), to which at least one control element 20 is connected; and this control element is connected to the dangerous machine or industrial plant and is designed to put the machine or industrial plant into an operating state (emergency stop state) that is safe for humans. If the triggering of the actuating element 30 was detected by the control and evaluating unit 4, then the control element 20 is activated and puts the machine or the industrial plant into the safe operating state.

An important advantage of the emergency command device 1, which is described above, consists of the feature that it can automatically recognize when the actuating element 30 of the emergency actuating unit 3 has been pressed. On manually triggering the actuating element 30, the flashing circuit arrangement 9, which is integrated into the emergency command device 1, is activated, so that the yellow light emitting diodes of the light emitting unit 7 flash, and, as a result, the triggering of the actuating element 30 can be optically visualized. In the case of the emergency command devices, known from the prior art, the triggering of the actuating element 30 had to be detected by the control and evaluating unit 4 by a complicated process, in order to detect, for example, which emergency command device 1 was triggered. In the present case this complicated process is dramatically shortened, since the comparator 90 of the flashing circuit arrangement 9 can detect the state of the switches 31, 32 by the measuring lead 10 behind one of the two switches 31, 32; and the flashing circuit arrangement 9 can activate the flashing of the yellow light emitting diodes of the light emitting unit 7.

In principle, it would also be conceivable that on triggering the actuating element 30 and on opening the two switches 31, 32, the flashing circuit arrangement 9 activates the flashing of the red light emitting diodes of the light emitting unit 7. However, this is not presently allowed, because the relevant standards require that the actuating element 30 has to glow permanently in the signal color red. In contrast, the flashing of the red light emitting diodes of the light emitting unit 7 would result in the actuating element 30 not glowing permanently, but rather its illumination would be switched on or off periodically or non-periodically.

As already explained above, the background element 33 is not relevant to safety, so that it may flash in the signal color yellow. The consequence thereof is that the red illumination of the manually triggerable actuating element 30, which is implemented by the red light emitting diodes of the light emitting unit 7, has to be reliable, if the emergency command device 1 is connected to a dangerous machine or an industrial plant and is ready to operate. This means that in the event that the red illumination of the actuating element 30 fails, the machine or the industrial plant, which is connected to the safety system 100, which is equipped with the emergency command device 1, has to be forced to come automatically to an emergency stop, because the actuating element 30 no longer glows in the signal color red, even though it should be visible, according to the standard, and, thus, should glow. In order to achieve this requirement, suitable measures would have to be taken in order to monitor the reliable operation of the red light emitting diodes of the light emitting unit 7.

A safety system 100, comprising a control and evaluation unit 4 and an emergency command device 1, which is not only a further development of the first exemplary embodiment, but is also based on it, shall be explained in more detail below with reference to FIG. 2. The construction details of the circuit wiring of the emergency command device 1 described below may be implemented individually or also in combination in the first exemplary embodiment of the emergency command device 1.

The basic safety function, which detects the triggering of the actuating element 30 in the manner described above by detecting a drop in the output voltage at the first safety output S12 below a preset or presettable threshold value and then activates the flashing of the yellow light emitting diodes of the light emitting unit 7, is also implemented in the manner explained above in this exemplary embodiment and shall not be described in detail again at this point. The light emitting unit 7 in turn is integrated into the emergency actuating unit 3, but was shown in FIG. 2 outside the emergency actuating unit 3 for the sake of simplicity. The two arrows, referred to as "red" or "yellow" are intended to symbolize that the red light emitting diodes of the light emitting unit 7 can backlight the actuating element 30 in the signal color red; and the yellow light emitting diodes can backlight the background element 33 in the signal color yellow.

The power supply device 8, which is shown in FIG. 1 in a highly simplified manner as a function block, comprises a first overcurrent and overvoltage protection device 80, which is connected to the first safety input S11, and a second overcurrent and overvoltage protection device 81, which is connected to the second safety input S21. The two overcurrent and overvoltage protection devices 80, 81 are designed such that they provide protection (implemented by small melting fuses) against currents that may be greater than, for example, 0.5 A, and protection (implemented by Transil diodes) against high voltage transients, which may reach, for example, up to 2 kV. These Transil diodes reduce high voltage peaks, which may be caused, for example, by switching operations, to voltage values as far as about 80 V. Thus, when an overcurrent or an overvoltage occurs, the two overcurrent and overvoltage protection devices 80, 81 can prevent the electrical and electronic system components of the circuit arrangement 2 from being damaged.

Furthermore, the power supply device 8 comprises a supply circuit 82, which is connected on the input side to the two overcurrent and overvoltage protection devices 80, 81 and is connected on the output side to an electronic switch 83, in particular a transistor. The electronic switch 83 is connected on the output side to a regulated power source 84, which can provide the yellow and red light emitting diodes of the light emitting unit 7 with a constant operating current, when the electronic switch 83 is closed; and the regulated power source 84 is supplied with an electrical supply voltage (for example, 24 V) by the supply circuit 82.

Furthermore, the power supply device 8 has an additional overvoltage protection device 85, which can be implemented, in particular, electronically. This overvoltage protection device 85 measures the voltage behind the supply circuit 82 and interrupts the electric current flow to the regulated power source 84 by opening the electronic switch 83 when the voltage is greater than, for example, 32 V. The regulated power source 84 can actually be operated at voltages of up to about 90 V. However, this branch of the circuit arrangement 2 also has the components of the flashing circuit arrangement 9 and two diagnostic devices 13, 14, which in the present case are designed only for voltages of no more than 36 V.

The flashing circuit arrangement 9 is designed such that it can drive an electronic switch 12, in particular, a transistor, which is disposed between the flashing circuit arrangement 9 and the light emitting unit 7, when the voltage at the first safety output S12 drops below the preset or presettable threshold value; and this is detected by the comparator 90 of the flashing circuit arrangement 9. In this case the yellow light emitting diodes, which are electrically connected together in series with the red light emitting diodes of the light emitting unit 7, can be bridged, so that the flashing of the yellow light emitting diodes of the light emitting unit 7 can be activated by the flashing circuit arrangement 9.

The circuit arrangement 2 has a first diagnostic device 13 and a second diagnostic device 14, the function of which shall be explained in greater detail below. Each of the two diagnostic devices 13, 14 comprises an electronic switch 130, 140 and a comparator 131, 141, in particular, a window comparator, which is connected to the electronic switch. The electronic switch 130 of the first diagnostic device 13, which may be, in particular, a transistor, is disposed between the first safety input S11 and the electronic switch 140 of the second diagnostic device 14, which may also be a transistor. The electronic switch 140 of the second diagnostic device 14 is disposed between the electronic switch 130 of the first diagnostic device 13 and the switch 30 of the first electrical switching path 5.

A measuring tap for the first diagnostic device 13 is provided at a transition point between the yellow light emitting diodes and the red light emitting diodes of the light emitting unit 7, with the yellow and red light emitting diodes being connected in series. The comparator 131 can determine by way of a measuring lead 132, whether the electric voltage, which is applied to the group of red light emitting diodes of the light emitting unit 7, matches a specified desired voltage value. If this is not the case as a result of a malfunction, then the comparator 131 opens the electronic switch 130. Deviations from the desired voltage value can occur, for example, when there are one or more electrical shorts between the red light emitting diodes of the light emitting unit 7.

Since the output voltage at the first safety output S12 drops below the threshold value, the control element 20, which is connected to the control and evaluating unit 4, is activated, so that an emergency stop of the dangerous machine or industrial plant can be initiated. Since the flashing circuit arrangement 9 also detects the drop in the electric voltage at the first safety output S12, the flashing of the yellow light emitting diodes of the light emitting unit 7 can be activated by the electronic switch 12, which is associated with the flashing circuit arrangement 9, and with the flashing circuit arrangement 9. This assumes, of course, that the yellow light emitting diodes of the light emitting unit 7 can still be supplied at all with current by the regulated power source 84. If this is no longer the case, then the yellow light emitting diodes of the light emitting unit 7 can neither glow nor flash.

Between the electronic switch 83, which is disposed behind the supply circuit 82, and the regulated power source 84 there is provided an additional measuring tap, which is connected by a measuring lead 142 to the comparator 141 of the second diagnostic device 14. The comparator 141 of the second diagnostic device 14 tests whether the regulated power source 84 is being supplied with sufficient electric voltage by the supply circuit 82, in order to be able to work correctly at all. If this is not the case due to a malfunction, then the comparator 141 opens the electronic switch 140 of the second diagnostic device 14 in the first electrical switching path 5. Since the voltage at the first safety output S12 drops consequently below the threshold value, the control element 20, which is connected to the control and evaluating unit 4, is activated, so that an emergency stop of the dangerous machine or the industrial plant can be initiated. The flashing circuit arrangement 9 also detects the drop in the electric voltage at the first safety output S12. The flashing of the yellow light emitting diodes of the light emitting unit 7 can be activated in turn by the electronic switch 12, which is associated with the flashing circuit arrangement 9, and with the flashing circuit arrangement 9. This in turn assumes, of course, that the yellow light emitting diodes of the light emitting unit 7 can still be supplied with current by the regulated power source 84. If this were no longer to be the case, then the yellow light emitting diodes of the light emitting unit 7 can neither glow nor flash.

Thus the two diagnostic devices 13, 14 provide that the glow of the red light emitting diodes of the light emitting unit 7 is reliable. If there should be a malfunction, so that the red light emitting diodes of the light emitting unit 7 can no longer glow properly, then the control element 20, which is connected to the control and evaluating unit 4, is activated by the control and evaluating unit, so that an emergency stop of the dangerous machine or industrial plant can be automatically initiated.

The circuit arrangement 2, shown in FIG. 2, exhibits in an advantageous way the same circuit topology as specified in DIN EN ISO 13849-1 (chapter 6.2.5).

What is claimed is:

1. An emergency command device, comprising:
   first and a second safety inputs connectable to a control and evaluating unit to receive an input voltage during operation of the emergency command device;
   first and a second safety outputs connectable to the control and evaluating unit;
   a first electrical switching path extending between the first safety input and the first safety output;
   a second electrical switching path extending between the second safety input and the second safety output;
   an emergency actuating unit comprising: a manually triggerable actuating element; a background element; and first and second mechanically, positively opening switches connected to the actuating element, the first switch being disposed in the first electrical switching path and the second switch being disposed in the second electrical switching path;
   a light emitting unit comprising: a set of red light emitting diodes arranged to backlight the actuating element; and a set of yellow light emitting diodes arranged to backlight the background element;
   at least one voltage detector comprising a comparator to detect an electrical output voltage at least one of the first and second safety outputs, wherein a drop in the output voltage below a preset or presettable threshold value causes the voltage detector to detect manual triggering of the manually triggerable actuating element; and
   a flashing circuit arrangement coupled to the comparator to activate a periodic or non-periodic flashing of the yellow light emitting diodes and/or the red light emitting diodes of the light emitting unit in response to detection by the voltage detector of manual triggering of the manually triggerable actuating element.

2. The emergency command device of claim 1, further comprising a measuring lead that connects the voltage detector to at least one of the first and second safety outputs.

3. The emergency command device of claim 1, further comprising:
   a supply circuit connected to the first and second safety inputs; and
   a regulated power source connected to the supply circuit and to the light emitting unit.

4. The emergency command device of claim 1, wherein the group of red light emitting diodes and the group of yellow light emitting diodes are electrically connected together in series.

5. The emergency command device of claim 1, further comprising:
   a first diagnostic device comprising an electronic switch disposed in at least one of the first and second electrical switching paths; and
   a measuring lead that connects the first diagnostic device to the light emitting unit, wherein the first diagnostic device is configured to detect an actual operating voltage of the red light emitting diodes of the light emitting unit and to open the electronic switch in response to the actual operating voltage deviating from a desired operating voltage.

6. The emergency command device of claim 5, wherein the first diagnostic device further comprises:
   a window comparator connected to the measuring lead and to the electronic switch, the window comparator being configured to detect the actual operating voltage of the red light emitting diodes of the light emitting unit and to open the electronic switch in response to the actual operating voltage deviating from the desired operating voltage.

7. The emergency command device of claim 5, further comprising:
   a second diagnostic device comprising a second electronic switch disposed in at least one of the first and second electrical switching paths;
   the second diagnostic device being configured to detect, via a second measuring lead, an electrical supply voltage of the light emitting unit and to open the second electronic switch in response to the actual supply voltage deviating from a desired supply voltage.

8. The emergency command device of claim 1, further comprising:
   an electronic switch associated with the flashing circuit arrangement and configured to activate the flashing of the yellow light emitting diodes of the light emitting unit.

9. The emergency command device of claim 1, wherein the actuating element and the background element comprise a semi-transparent plastic that appears gray in an unlit state.

10. A safety system for putting a dangerous machine or an industrial plant into a safe state, the safety system comprising:
    the emergency command device of claim 1;
    the control and evaluating unit, wherein the control and evaluating unit includes at least one safety output; and
    a control element connected to the at least one safety output of the control and evaluating unit, the control element being configured to put the machine or industrial plant into the safe operating state upon activation.

* * * * *